United States Patent
Hall et al.

(10) Patent No.: US 6,907,509 B2
(45) Date of Patent: Jun. 14, 2005

(54) AUTOMATIC PROGRAM RESTRUCTURING TO REDUCE AVERAGE CACHE MISS PENALTY

(75) Inventors: Brian C. Hall, Calgary (CA); Robert J. Blainey, Newmarket (CA); Steven W. White, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 218 days.

(21) Appl. No.: 10/298,483

(22) Filed: Nov. 18, 2002

(65) Prior Publication Data

US 2003/0097538 A1 May 22, 2003

(30) Foreign Application Priority Data

Nov. 19, 2001 (CA) ............................................. 2363182

(51) Int. Cl.[7] ............................................. G06F 12/00
(52) U.S. Cl. ............................. 711/201; 711/5; 711/118; 711/170; 711/173
(58) Field of Search .................................. 711/201, 173, 711/5, 118, 170

(56) References Cited

U.S. PATENT DOCUMENTS

| 5,590,309 A | * | 12/1996 | Chencinski et al. ........ 711/145 |
| 5,854,934 A | * | 12/1998 | Hsu et al. .................... 717/161 |
| 5,903,917 A | * | 5/1999 | Douceur et al. ............. 711/201 |
| 5,943,691 A | * | 8/1999 | Wallace et al. .............. 711/172 |
| 6,041,393 A | * | 3/2000 | Hsu ........................... 711/157 |

FOREIGN PATENT DOCUMENTS

EP          782078 A2 * 7/1997 ........... G06F/12/08

* cited by examiner

*Primary Examiner*—Stephen Elmore
(74) *Attorney, Agent, or Firm*—Gregory M. Doudnikoff

(57) ABSTRACT

A method, a computer or computer program product for automatically restructuring a program having arrays in inner loops to reduce an average penalty incurred for bursty cache miss patterns by spreading out the cache misses. The method may be used separately or in conjunction with methods for reducing the number of cache misses. The method determines a padding required for each array according to a proportion of the cache line size, to offset the starting points of the arrays relative to the start of a cache line memory access address for each array. Preferably, the starting points of the arrays that induce bursty cache misses are padded so that they are uniformly spaced from one another.

27 Claims, 3 Drawing Sheets

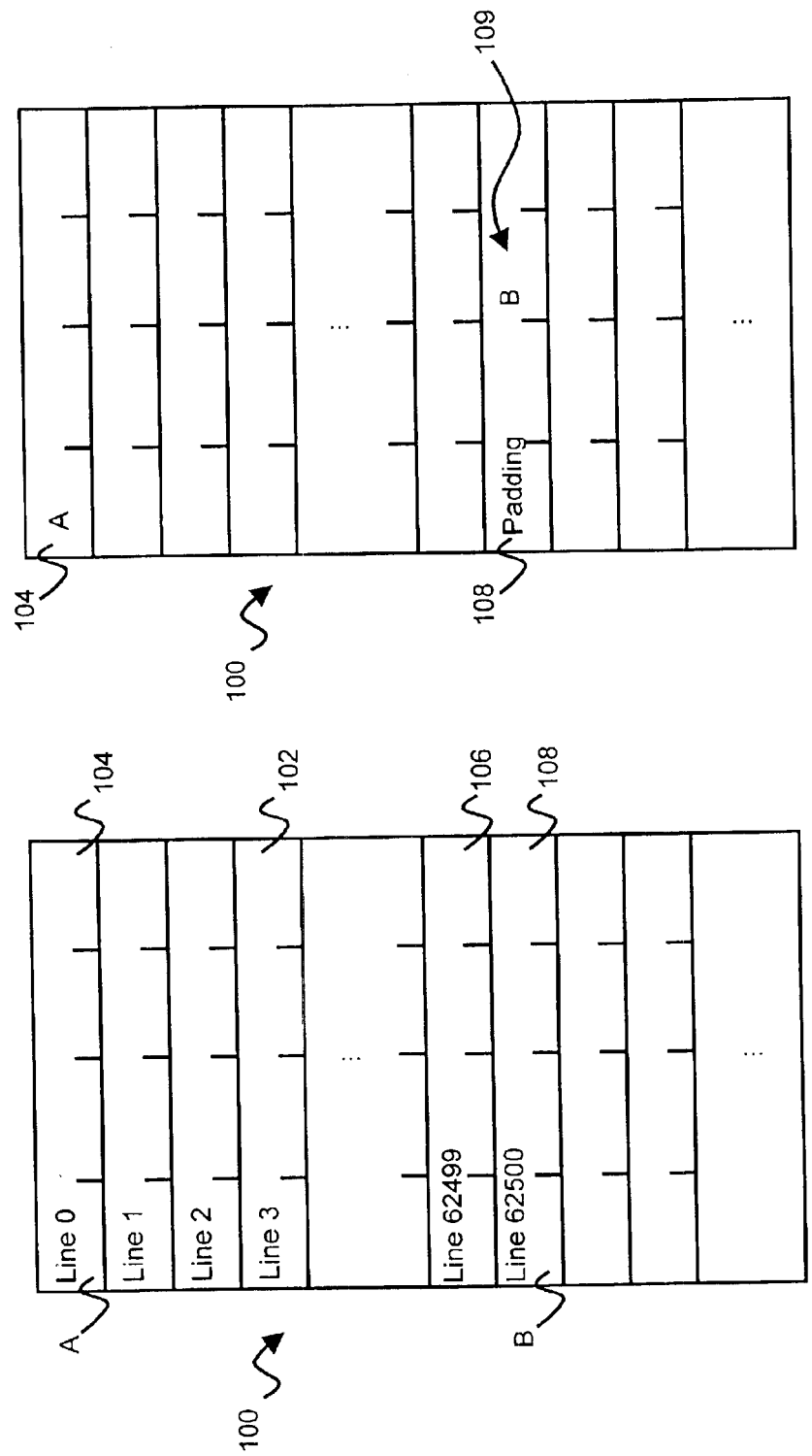

AUTOMATIC PROGRAM RESTRUCTURING TO REDUCE AVERAGE CACHE MISS PENALTY

BACKGROUND OF THE INVENTION

1. Field of the Invention

This invention relates to optimizing compilers and run-time memory arrangements, particularly microprocessor cache memories for computer systems.

2. Description of the Related Art

Computer system designers typically must strike a balance between cost and performance considerations. Advances in microprocessor performance relative to cost has tended to out-pace advances in memory access performance. Despite the general decline in computer component prices, it remains prohibitively expensive to include in a computer system enough computer memory adapted to feed data to the microprocessor at a rate that satisfies the microprocessor's ability to process the data.

One common compromise to this design conundrum, called "caching", is to use faster but less dense memory placed nearer the CPU, in one or more hierarchical levels, coupled to cheaper and slower main memory. Data is copied into the faster memory (i.e., "cache" memory) from main memory when required by the microprocessor and may be copied back out to main memory if its value is changed (i.e., made "dirty") during processing. For example, a level 1 (L1) cache (or caches) is typically provisioned on-board with the microprocessor while a level 2 (L2) cache placed nearby supports the L1 cache. Additional cache levels may be provided.

According to cache replacement strategies, most frequently requested data required by the microprocessor are stored in the L1 cache, the next most frequently used data are stored in the L2 cache, and so on. The least frequently used data items are stored in main memory (RAM or ROM) distant from the microprocessor. If the main memory is insufficient, additional data may be stored in mass storage devices. When the microprocessor requires information, the memory hierarchy is usually examined to satisfy the request. The L1 cache is first examined, followed by the L2 cache, main memory and, finally, mass storage. A "miss" occurs if the cache level being examined cannot satisfy the request for the information. A cache miss results in lost microprocessor cycles due to increased memory access time as a more remote and slower hierarchical level must be examined, thus degrading system performance.

FIG. 1 illustrates an exemplary system architecture employing an L1 and L2 cache reminiscent of the PowerPC® processor marketed by International Business Machines Corporation. Computer system 50 includes a central processing unit (CPU) 52, interconnected via system bus 62 to ROM 64, RAM 66 and various input/output (I/O) devices 66 such as mass storage devices, user interface devices or printing devices (all not shown). Though not shown, some of these peripheral I/O devices 66 may be connected to system bus 62 via a peripheral component interconnect (PCI) bus. PowerPC architecture provides for more than one processing unit, as is indicated by processing unit 53.

CPU 52 comprises a microprocessor core 54 and separate on-board L1 caches 56 and 58 for storing program instructions and data, respectively. The L1 caches 56 and 58 are implemented using high speed memory devices. The L1 caches 56 and 58 are included with the microprocessor core 54 on a single integrated chip 72, as is well known in the art, for providing single processor cycle access times.

An intermediate L2 cache 60 is connected to the L1 caches 56 and 58 via a processor bus 74. L2 cache 60 is also connected to a system bus 62 perhaps through a bus interface (not shown). L2 Cache 60 may comprise a 256 KB or 512 KB high speed memory chip. As L2 cache 60 lies between chip 72 and system bus 62, all information from RAM 66 or ROM 64 destined for microprocessor core 54 typically passes through L2 cache 60. It may take several processor cycles to access L2 cache 60.

A cache memory is usually divided into cache lines having a fixed number of sequential memory locations (e.g., 128 bytes). The data in each cache line is associated with its main memory location by an address tag. When a processor requires information that cannot be located in cache memory, the processing unit looks to main memory for the information. A main memory access performs a cache line-fill operation, replacing a line of cache memory with a cache line size amount of data from main memory that contains the required data. As is well known, memory interfaces are configured to provide multiple byte transfers per memory access request to more efficiently transfer information between main memory and CPU. The additional bytes transferred in addition to those immediately required by the processor are thus more readily available for subsequent use.

When data from main memory is transferred to the cache, a cache line must be chosen in which to store the data. Cache memory implementations vary by the manner in which they map main memory addresses to cache lines. For direct mapped caches, a main memory address can only be mapped to a single cache line. Fully associative caches permit the mapping of an address to any cache line while N-way set associative caches map a main memory address to one of N lines, where N is typically between 2 and 16. Numerous methods exist for choosing which specific cache line is to be used when replacing cache lines (casting-out) as is well known in the art.

Various cache configurations are known to reduce memory latency times, typically by hiding operations. For example, U.S. Pat. No. 6,138,208 to Dhong et al., which issued Oct. 24, 2000 to the assignee of the present invention, illustrates a multiple level cache memory with overlapped L1 and L2 memory access. When a request for information is issued by a processor, the request is forwarded to the lower level of the cache before determining whether a cache miss of the value has occurred at the higher level. Address decoders may be operated in parallel at the higher level to satisfy the maximum number of potential simultaneous memory requests. Thus, L1 and L2 cache examination may be overlapped. Dual ported non-blocking caches are also known that allow access to data in a cache while processing an outstanding cache miss. Store-back buffers may be used when a dirty cache line needs to be castout to make room for a new line. See, for example, D. J. Shippy, T. W. Griffith, and Geordie Braceras, "POWER2 Fixed-Point, Data Cache, and Storage Control Units", *PowerPC and POWER2: Technical Aspects of the New IBM RS/6000*, IBM Corporation, SA23-2737, 1994, pp. 29–45 (reproduced at rs6000.ibm.com under resource/technology/p2ppc_tech.html).

As microprocessor clock rates continue to accelerate faster than memory access rates, the effects of cache misses play an increasingly important role in system performance. Shortly after microprocessor caches were invented in the 1960's, attempts were made, by hand, to restructure programs to exploit the caches. Today, compilers and preprocessors can automatically restructure programs to improve performance using a variety of algorithms.

Historically, academic studies and software inventions that aimed to reduce the effects of cache misses have focused on reducing the number of cache miss occurrences. For example, a long-used cache-based optimization is the re-ordering of a nested set of loops with a goal of having a "stride-1" inner loop. After this optimization, the "spatial locality" of the program is typically enhanced as adjacent iterations of the inner loop access data items that are adjacent in memory. As a result, when a cache miss occurs, the returning cache line provides several required data items, and the miss penalty is effectively amortized over several elements.

Another well-known optimization, referred to as "cache-blocking", aims to improve the "temporal locality" of a program's data accessing pattern. This optimization requires that a sub-section of the program make multiple passes over one or more data structures, and is often described using matrix multiplication as an example. When performing A×B=C, where A, B, and C are all N×N matrices, the number of uses of a particular element of the A or B matrices is roughly N. For large matrices, data re-use from memory may be relatively high; however, if a cache-blocking scheme is not employed, data re-use within the cache is often low (~1) since the long interval between adjacent uses of a particular element results in the element being castout to make room for the flow of other elements accessed during the interval.

In the case of matrix multiplication, cache blocking can be implemented by logically partitioning the larger matrices into many smaller blocks, with the small block size being chosen such that the sub-blocks can reside in cache while each element is accessed several times. For current cache implementations, re-use factors of 10–100 are not uncommon.

A third classic approach to reducing cache miss counts is known as, "padding". For most caches (those which are not fully associative) a given cache line (and therefore a given data element) can reside in a limited number of slots (i.e., particular cache lines) in the cache. Thrashing, or the otherwise unnecessary replacement of cache lines, occurs when the number of data items from main memory contending for a given slot (direct mapped) or set of slots (set-associative) exceeds the number of slots implemented by the cache. For example, for a 4 KB direct-mapped cache with 128-byte lines, typically data items whose main memory addresses differ by a multiple of 4 KB will contend for the same spot in the cache. If two or more of the items are frequently accessed, the data items will take turns displacing each other, resulting in additional cache misses. To reduce the cache miss count in this case, the appropriate data structures may be "padded", often increasing the size of the program's data footprint, so that the two or more "hot" items are no longer in main memory addresses which differ by a multiple of 4 KB. By moving at least one of the data items by 128 bytes (the line size), the competing items map to distinct slots in the cache and the contention between them is eliminated.

One padding technique is disclosed in U.S. Pat. No. 5,943,691 of Wallace, et al., issued Aug. 24, 1999 to Sun Microsystems, Inc. and entitled "Determination of array padding using collision vectors". Wallace, et al. disclose a method and apparatus for determining and resolving cache conflicts. According to the method of the invention, a cache shaped vector that characterizes the size and dimension of the cache is determined under computer control. A determination of at least one cache conflict among the arrays stored in the main memory is then determined, in addition to the conflict region in the cache for the conflicting arrays. A padding value is then determined for the arrays stored in the main memory, and the memory locations of the arrays are adjusted in accordance with the padding value to prevent cache conflicts when the data from the conflicting arrays is transferred from the main memory into the cache.

A further padding technique is described in U.S. Pat. No. 6,041,393 to Hsu issued Mar. 21, 2000 to Hewlett-Packard Company and entitled, "Array padding for higher memory throughput in the presence of dirty misses". An array padding technique is described that increases memory throughput in the presence of dirty misses for computer systems having interleaved memory. The technique pads arrays so that the starting addresses of arrays within a target loop are separated by P memory banks, where P is a rounded integer equal to the number of memory banks divided by the number of arrays. The number of banks of separation can be incremented or decremented by 1 to also avoid path conflicts due to the sharing of buses in a typical hierarchical memory sub-system.

Since cache-blocking techniques aim to improve temporal locality, padding is often additionally employed to minimize unnecessary castouts.

These attempts to reduce cache miss effects typically assume that the penalty for a cache miss is relatively constant, which is not typically the case in current systems. The penalty incurred by a program due to cache misses is often difficult to compute, but it is a function of the number of cache misses, the penalty (memory latency) for each, and the amount of unrelated (independent) work which is available to overlap with each given miss. The latency for a given cache can be highly variable, and can depend on the degree of memory activity (increased contention often increases queuing and therefore latency) and leading and trailing edge effects of the memory and buses.

As an example of leading and trailing edge effects affecting memory responsiveness, when there are two misses from the same microprocessor in the Model 397™ Workstation from International Business Machines Corporation, the latency for a second miss can range from 25 cycles to 65 cycles, depending on the interval between miss requests and whether a dirty line needs to be castout to make room for the second line. The IBM Model 397 implements a store-back buffer so that if sufficient time elapses between the two cache misses, the processor will have emptied the store-back buffer and the store-back buffer will be available if the second miss causes a line to be castout—in this case, the castout generated during the second miss will have no effect on the latency for this miss. In the absence of castouts, the latency can vary between 25 and 40 cycles, with the latter case being back-to-back misses where little of the leading/trailing edge and set-up requirements are able to be hidden.

Cache misses that are bunched together in time (bursty), as is often seen in existing programs, suffer from longer average latencies than cache misses that are more uniformly spaced in time.

As an example, consider the following simple loop running on a microprocessor with a 64 KB cache having a cache line size of 128 bytes:

Sub-routine DOT_PRODUCT(SUM)
REAL*8 SUM, A(1 000 000), B(1 000 000)

```
COMMON A,B
SUM=0.
DO I=1,1 000 000
SUM=SUM+A(I)*B(I)
ENDDO
RETURN
END
```

The two arrays total 16,000,000 bytes (8 bytes for each of the 2,000,000 elements). The three traditional methods for reducing cache misses do not provide performance gains for the above code. The access patterns are already stride-1 for adjacent elements, so there is no opportunity to improve spatial locality. There is no potential for re-use as every element is used only once; thus, cache-blocking will not provide a benefit. For the $I^{th}$ iteration of the loop, A(I) and B(I) are referenced; the number of bytes between these references is 8,000,000, which does not divide evenly by 64K (8,000,000 mod 64K=4608). Therefore, no thrashing occurs even in a direct-mapped cache and traditional padding techniques will not provide a performance gain.

However, since the distance between A(I) and B(I) is an exact multiple of the cache line size 128 (8,000,000 128*62500), when a miss for the A element occurs in a given iteration, then a miss for the B element will occur in the exact same iteration, maybe a cycle apart.

The Model 397, and all POWER2, P2SC, and POWER3 designs, permits the detection of at least a second miss while the first miss is outstanding, and provides partial/full overlap of a trailing edge of the first miss with some portion of the second miss.

What is needed is a method and system adapted to recognize program instructions that, when executed, generate one or more subsequent caches misses while a first cache miss is outstanding, and automatically restructures the program to reduce its average cache miss penalty.

SUMMARY OF THE INVENTION

The invention provides a method and apparatus for determining and implementing array padding to automatically restructure a program to reduce its average cache miss penalty. Padding between arrays can be determined in an efficient and effective manner using the method and apparatus in accordance with the invention.

According to one aspect, the invention provides a method for automatically structuring a program having arrays in at least one inner loop to reduce the average cache miss penalty when the program is executed in a computer system having a CPU, a cache and a memory system. The method comprises locating the inner program loops that generate arrays which require repeated access to the cache; and spacing apart the arrays associated with the inner program loops in the memory system using inter-array padding so that cache misses do not occur close together when the inner program loops are executed in the computer system.

To space apart the arrays, the arrays may be organized into one or more alignment groups. A different alignment constraint may be assigned to each of the alignment groups. For each array, an amount of inter-array padding may be determined to conform to the alignment constraint for the alignment group to which the array is assigned. According to an embodiment of the invention, to assign an alignment constraint, the number of alignment groups may be determined and a proportion of a cache line size may be computed using the number of alignment groups. The alignment constraint may be computed for each group as a respective multiple of the proportion of the cache line size.

In accordance with the method, organizing the arrays comprises assigning an array to one of the alignment groups so that each array in any one alignment group is generated by an inner loop different from an inner loop that generates any other array in the alignment group.

Further, computing the alignment constraint may include conforming the alignment constraint to a further alignment constraint imposed by the memory system.

The method provides that, to space apart each array, a starting point of each array may be shifted by inserting inter-array padding, as necessary, relative to a starting point of a cache line access address in the memory system. The inter-array padding may be conformed to an alignment constraint of the memory system.

In accordance with an aspect of the invention, there is provided a further method for automatically structuring a program that includes at least one inner loop to reduce an average cache miss penalty when the program is executed in a computer system having a CPU, a cache and a memory system, the method comprising (a) identifying arrays generated by one or more of the inner loops, to permit the arrays to be spaced-apart when stored in the memory system; (b) organizing the arrays in one or more alignment groups; (c) determining the number of alignment groups; (d) computing an alignment constraint for each alignment group; and (e) mapping each array to conform to the alignment constraint computed for the alignment group to which the array belongs.

Computing an alignment constraint may further comprise steps of determining a cache line size used to read the cache; computing a proportion of the cache line size by dividing using the cache line size by the number of alignment groups; and computing the alignment constraint for each alignment group as a respective multiple of the proportion of the cache line size.

According to this method, organizing comprises assigning an array to an alignment group so that each array in any one alignment group is generated by an inner loop different from an inner loop that generates any other array in the alignment group. The method may further comprise organizing the arrays in one or more loop groups so that each array in a loop group is identified in at least one inner loop with another array in the loop group and not identified with any arrays in any other loop group; and wherein (b) to (e) are performed for each loop group.

Yet a further aspect of the invention provides a computer readable medium containing executable program instructions for structuring a program having at least one inner loop that generates arrays to reduce the average cache miss penalty when the program is executed in a computer having a CPU, a cache and a memory system. The computer readable medium comprises program instructions for identifying arrays generated by the inner loops; program instructions for determining an alignment constraint for each array; and program instructions for inserting padding between arrays when the arrays are stored in the memory system, the amount of padding inserted being determined by the alignment constraint.

Another aspect of the invention provides a computer readable medium including executable program instructions for structuring a program having at least one inner loop that generates arrays to reduce an average cache miss penalty when the program is executed in a computer having a CPU, a cache and a memory system. The computer readable medium comprises program instructions for identifying one or more of the inner loops that generate arrays which require padding when stored in the memory system; program instructions for arranging the arrays into one or more alignment groups; program instructions for determining a number of alignment groups; program instructions for computing an alignment constraint for each alignment group; and programs instructions for inserting padding between at least two arrays stored in the memory system, the amount of padding inserted being determined by the alignment constraint for the alignment group to which the respective arrays belong.

A further aspect of the invention includes a computer comprising a CPU operable to execute a program having one or more inner loops; a cache having a plurality of cache lines, each having a cache line size and coupled to the CPU; a memory system coupled to the cache to provide data to or to receive data from the cache in response to access requests; and a plurality of data arrays stored in the memory system, the arrays to be accessed in at least one of the inner loops and each array having a starting point spaced out by a respective alignment constraint from a starting point of a cache line access address in the memory system. Accordingly, the alignment constraint is determined from a portion of the cache line size so as to reduce the average cache miss penalty when the at least one inner loop is executed.

BRIEF DESCRIPTION OF THE DRAWINGS

Further features and advantages of the present invention will become apparent from the following detailed description, taken in combination with the appended drawings, in which:

FIG. 2 is a block diagram of an implementation of exemplary data structures in main memory in accordance with the prior art;

FIG. 3 is a block diagram of an implementation of the data structures of FIG. 2 in main memory in accordance with the invention.

It will be noted that throughout the appended drawings, like features are identified by like reference numerals.

DESCRIPTION OF THE PREFERRED EMBODIMENT

Figure 1:
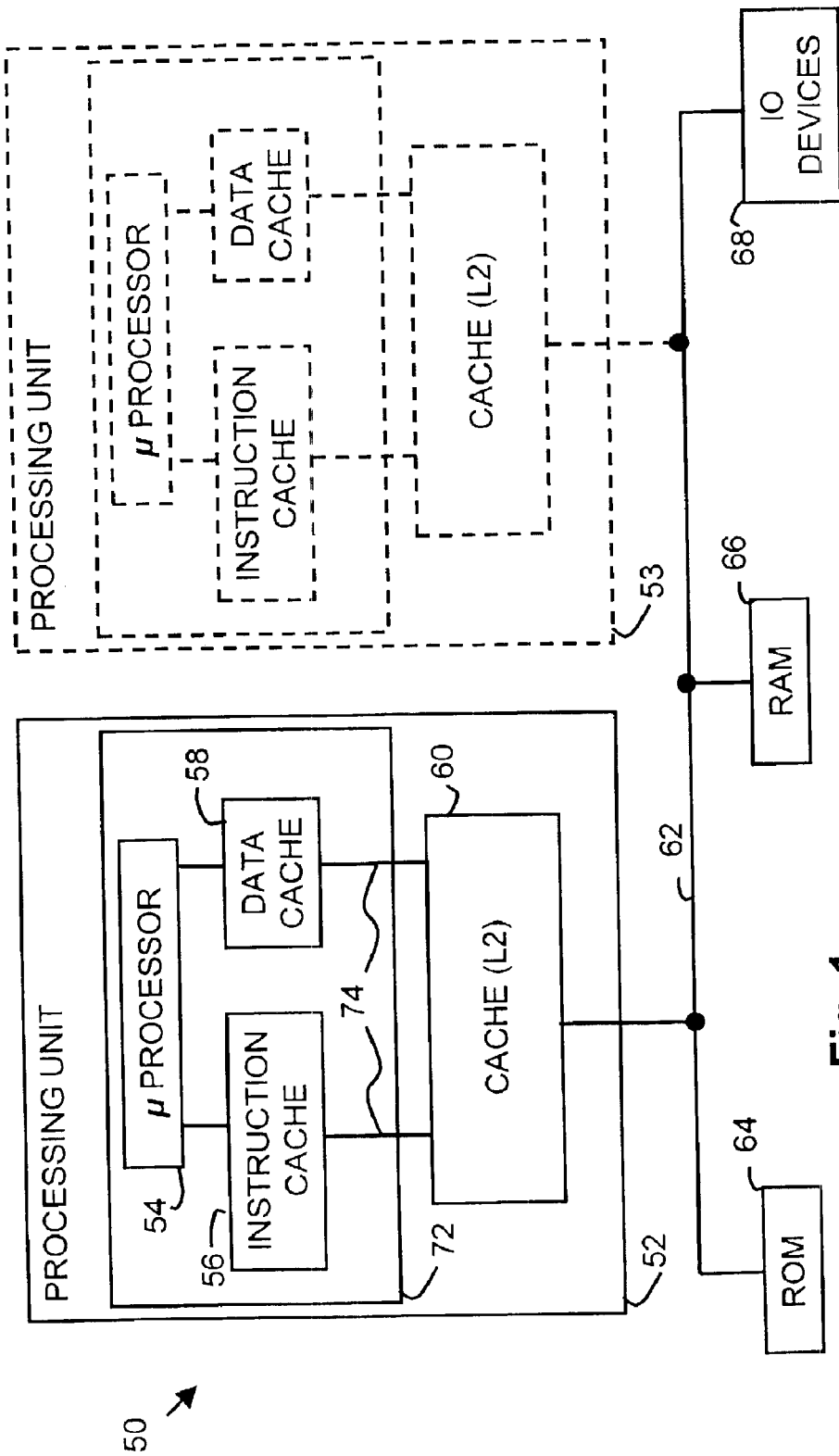
FIG. 1 is a block diagram of a prior art computer system having a hierarchical cache memory system.

Program instruction code that produces bursty cache misses results in poorer system performance than code producing more uniformly-spaced misses. In accordance with the invention, memory padding techniques can be used to alter the timing of cache misses, thus reducing the average cache miss penalty.

Consider again the sample program code loop described above with reference to FIG. 2, illustrating an implementation of the common array data structures A and B in main memory. Main memory 100 is a plurality of consecutive lines 102, where each line is 128 bytes in length. Array A is stored in main memory 100 having a starting point at a first line, line 0 (104) and an end point at line 62499 (106). Array B follows array A and has a starting point at line 62500 (108) extending for a further 62499 lines. As noted above, the distance between an $I^{th}$ element of array A and $I^{th}$ element of array B differs by a multiple of the cache line size. If a cache miss for a load of an element of A occurs in a given iteration of the sample loop, then a miss for the load of a like element of B will occur in the exact same iteration, about a processor cycle apart.

A cache miss transfers a cache line equivalent of bytes from main memory 100 to L1 cache. Each element of A and B is 8 bytes in length. Thus, for every 16 iterations of the sample loop (128 byte lines/8 bytes per element), there will be two cache misses (but no castouts). The repeated timing cycle appears as:

25 cycles: Miss 1 latency 40 cycles: Miss 2 latency 32 cycles: 32 load instructions+16 multiply/add instructions (assuming one load unit)

97 cycles: total

In the sample loops, the cache misses occur in pairs, one immediately following the other. According to the invention, main memory padding is introduced to space the cache accesses for arrays A and B apart, as illustrated by FIG. 3.

Typically, relative memory addresses for the starting points of arrays are allocated so that the memory address is divisible by the cache line size to optimize memory transfers. Each read of main memory retrieves one cache line of bytes beginning at a physical address divisible by the cache line size that is nearest a start of the data required. If the starting address for one of the arrays is spaced or offset from the other at a memory address divisible by the cache line size, a cache miss in the first array will occur in the second array within a few (generally one) cycle(s). If a pair of arrays are causing adjacent cache misses, then one array may be spaced in memory from the other by a padding between the two arrays. The padding preferably has a length equivalent to a portion of the cache line size (e.g., one half) to introduce a delay between successive cache misses that would otherwise be back-to-back. Preferably, the amount of padding inserted between such arrays is sufficient to ensure that when the initial elements of the arrays are stored in the cache, the starting points are evenly distributed within the length of respective cache lines.

For the sample code, a padding of 64 bytes is inserted in main memory 100 shown in FIG. 3 at line 62500 (108), before the start of array B (109). It should be understood that padding may be inserted before array A, or before each array, assuming each array is padded by a different amount.

After padding, a memory access to the first element of array B initially retrieves line 62500 from main memory 100, as in the prior art. However, line 62500 contains only 64 bytes of array B. Subsequent accesses return 128 bytes of array B, until the final access. As a result, if a miss results for A(I), the next B array miss will not occur until B(I+8), which is 8 iterations or 16 cycles later. The timing cycle thus becomes:

25 cycles: Miss 1 latency 16 cycles 16 loads and 8 multiply/add instructions 25 cycles: Miss 2 latency 16 cycles 16 loads and 8 multiply/add instructions 82 cycles: total In this example, the result of the optimization realized by memory padding is more than a 15% performance improvement, for this code sample, which does not benefit from any of the three prior art cache optimization methods described above.

Furthermore, in a multi-processor environment, a more uniform stream of cache misses (vs. a bursty one) will tend to be more palatable for a memory sub-system, resulting in additional reductions in latency penalties.

The method of padding in accordance with the invention provides an additional improvement when the number of cycles of computational work per iteration is larger than a multiply/add instruction. In the above code example, unless partial sums are introduced, the add operations are all dependent—each uses the result of the immediate prior add operation as an input to the current operation; therefore, each iteration typically requires four cycles (an average value for today's floating point units).

To more fully illustrate the new gain mechanism, assume a divide operation requires 20 cycles and consider the loop from the above example with the modified SUM statement, "SUM=SUM+A(I)/B(I)".

Frequently, a compiler will "software pipeline" a loop, attempting to hide cache access cycles (and other latencies). Software pipelining results in the load (and the cache miss detection if one occurs) being scheduled a small number of iterations ahead of the consuming instruction (the divide in this case). As a result, the misses will incur the 25-cycle minimum (for the IBM Model 397, they occur 160 cycles apart); however, a larger gain is achieved.

By spreading out the misses in time, and by moving the load instructions two iterations ahead of its use, the penalty for the 25-cycle miss can be completely hidden underneath the 40 cycles consumed by the two divide instructions which will be dispatched and executed while the miss is outstanding. Without spacing apart the miss requests, the back-to-back cache misses would cause the second miss to be held in the load unit until the trailing edge return of the first miss. The instruction queues could then fill up, blocking the subsequent dispatch of the divides. As a result, only the second miss would be totally hidden under the divide instructions.

There are other hardware characteristics that motivate spreading cache misses using array padding to improve performance. Out-of-order execution hardware with non-blocking caches have limitations with respect to how many outstanding cache misses can be tolerated, and with respect to how many instructions can be executed out-of-order while earlier instructions are blocked. When these limits are reached, instruction execution must be suspended while waiting for outstanding misses to be serviced, or while waiting for earlier blocked instructions to be executed.

Consider a loop containing a number of independent streams of computation. A processor that permits out-of-order execution, in conjunction with non-blocking caches, could continue to execute other streams of computation while one or more streams were blocked by cache misses. However, if too many back-to-back cache misses occurred, one of the limits may be reached. That is, instruction execution could be stalled because a limit for outstanding cache misses is reached, or because the processor was prohibited from executing later instructions while the earlier instructions were blocked.

Spreading out the cache misses using array padding may improve performance by having the effect of limiting the maximum number of outstanding cache misses incurred while executing the code, and by permitting out-of-order execution to continue because more streams of execution are simultaneously available, or because the cache miss latency has been reduced and instructions spend less time blocked as a result of a cache miss.

Figure 4:
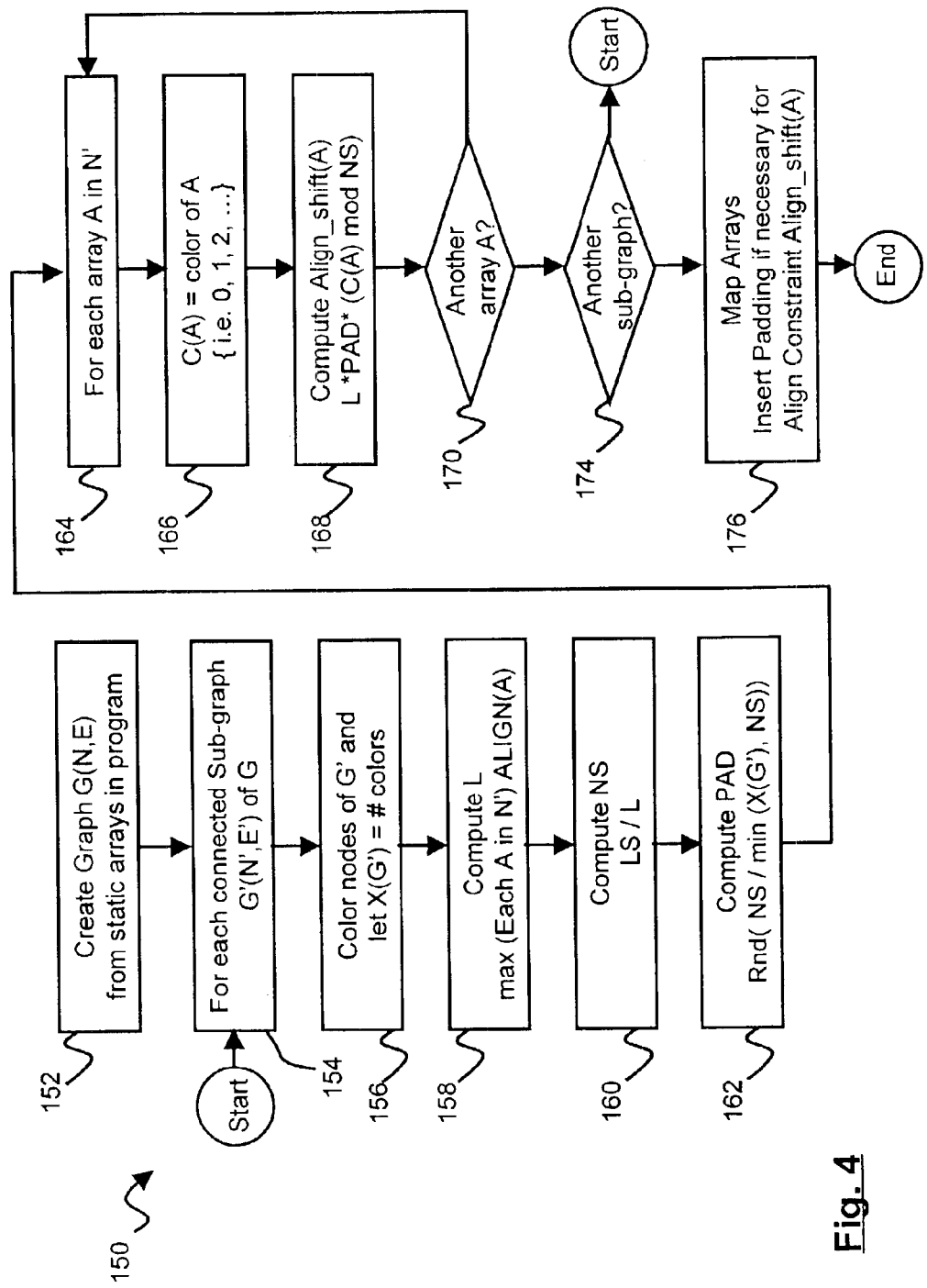
FIG. 4 is a flow chart illustrating a memory padding method in accordance with the invention.

FIG. 4 is a flow diagram for an exemplary memory padding method 150 in accordance with the invention. The method performs automatic program restructuring by padding arrays to reduce average cache miss penalties. Although the method is described with reference to computer system 50 shown in FIG. 1 and an optimizing compiler optimized for this target hardware, the method of this invention can be employed in computer systems configured in many other ways.

The exemplary method 150 includes the following operations. For a target program intended to be run on CPU 72, the optimizing compiler identifies arrays, by analyzing one or more inner loops of the program, that may require padding when the arrays are stored in main memory 66. Every array does not need to be offset from every other array. Preferably, all arrays that need not be offset are identified. The arrays from the program inner loops may be organized into one or more groups, in which each array in any one group is in at least one inner loop with another array in the group, but in a different group from any other array in a different inner loop.

For example, the compiler may create an undirected graph G(N,E) (154) including a set of nodes N of all of the statically allocated arrays in the target program and a set E of edge pairs (A,B) denoting arrays (e.g., A and B) referenced together in the inner loops located within the code. Within the inner loop, the array pairs (A,B) are preferably accessed within a few processor cycles of one another, typically fewer cycles than average latency for a consecutive second cache miss. Preferably, the arrays are larger than the cache line size, requiring multiple memory-to-cache transfers.

Operations 154 to 174 determine a relative alignment required for each array. Arrays that cause bursty cache miss activity relative to one another are allocated starting addresses that are spaced from one another relative to a notional start address that aligns with a cache memory access. In this way, the starting points of contending arrays will be respectively shifted from the start of a line of cache memory when the program loop is executed. Preferably, arrays are grouped into one or more alignment groups that are to be spaced from one another. Arrays may be assigned to the same alignment group if they are identified in an inner loop different from every other array in the alignment group. For example, operations 156 to 174 are performed for each connected sub-graph G'=(N',E') of graph G. The sub-graphs may be constructed by a traversal of G according to known techniques. Nodes in the same sub-graph represent arrays that, when referenced, may cause bursty cache miss activity (i.e., two or more adjacent cache misses). However, any one array node in a graph G' may only cause bursty activity with another array node with which it shares an edge. Thus, the arrays represented by the nodes that share an edge are candidates for spaced alignment and possible padding relative to one another but not necessarily to other arrays in the sub-graph. It is preferable to determine and group in alignment groups the nodes (i.e., arrays) of G' sharing this type of relationship to compute more effective alignment padding shift and, hence, amounts.

In 156, the nodes of sub-graph G' are colored using any of the well-known techniques. Nodes sharing an edge are given different colors (i.e., arranged in different padding groups) that may be represented by the series, 0, 1, 2, etc. The number of colors required to color the sub-graph X(G') determines the number of alignment groups. X(G') is useful for determining an amount of alignment shift required for each alignment group as set out below.

For more efficient transfers and memory allocation, memory systems may use memory alignment to constrain available memory address choices and locate data structures at particular rather than purely arbitrary memory addresses. Standard data types are located at an address that is a multiple of the type's length in bytes. In 158, L is computed to assist with the determination of a portion of the cache line size to use as a basis for alignment shifting, and to conform the amount of shifting to the alignment constraint. L is computed by examining each ALIGN(A) value for each array A in N' and selecting the largest value, where ALIGN (A) represents the required alignment of array A (e.g., 4 for single float, 8 for double float). In 160, the maximum number of aligned slots (NS) or potential shift positions on a notional cache line is computed as LS/L where LS is the cache line size in bytes.

The alignment groups are preferably evenly distributed among the NS slots. For example, if there are 3 alignment groups and 16 slots, the starting points of the arrays in respective alignment groups may be 5 slots apart. PAD, or the number of slots between starting addresses, may be computed as Rnd(NS/min(X(G'),NS)) where Rnd( ) rounds down to the nearest integer. If the number of alignment groups X(G') exceeds NS, PAD is set to 1 to maintain conformity with the alignment constraint. The expression Align_shift(A) L*PAD* (C(A) mod NS) is used to compute the amount of alignment shift in bytes to be inserted between each alignment group.

Operations 164 to 170 illustrate a loop executed to determine the amount of alignment shift relative to the start of a cache line in memory (Align_shift(A)) that is useful for computing a relative memory address (rmaddr(A)) for each A in N'. In accordance with the preferred embodiment of the invention, start addresses for cache memory contending arrays are spaced apart from relative memory addresses that align with cache line size (i.e. rmaddr(A) mod LS=0) by a shift amount Align_shift(A) where the desired relative address rmaddr(A)$_{new}$ satisfies the expression (rmaddr(A)$_{new}$–Align_shift(A)) mod LS=0.

Previously, in 156, each array A in N' was assigned a color (i.e., alignment group), preferably from the set of colors 0, 1, 2, etc. The color of an alignment group may be used to determine a multiplier of the portion of the cache line size to be used as a shift amount for the group, or to assign a slot from the number of slots in a cache line. The color of array A, C(A), is determined in 166. In 168, Align_shift(A) for each array A may be assigned by computing a different multiple of the portion of the cache line size using the color as an alignment group number, in accordance with the expression L*PAD*(C(A) mod NS).

In 170, if a further array A is available for the current sub-graph, processing continues from 164. In 174, if all arrays from N' are processed and another sub-graph is available, processing continues from 154. Otherwise, the loop processing terminates.

Following the above determination of the preferred shift amount for each array (Align_shift(A)), in step 176 the static arrays for the entire program may be mapped making reference to the required alignment restriction. Generally, in accordance with the prior art, to conserve memory usage static array structures are contiguously mapped while conforming to any alignment constraint imposed for standard data types (i.e. rmaddr(A) mod Align(A)=0). In accordance with the invention, array allocation is further constrained to shift the starting address according to the expression rmaddr (a)–Align_shift(A) mod LS=0. Padding, or the insertion of a dummy block of memory ahead of an array may be necessary to conform to this constraint.

Absolute addressing for the arrays may be mapped together by a linker or interprocedural compiler, for example.

The above-described method of padding can be implemented using well-known computer programming techniques. The steps described herein can be readily integrated into a modem optimizing compiler and be used with prior art cache miss avoidance techniques described above.

Moreover, the operations described herein may be implemented independently of a compiler such as in a preprocessor, other application program, middleware or other computer program product comprising a computer useable medium having computer readable code means for instructing a computer.

This invention provides a method, among other things such as a computer or computer program product, to reduce the average penalty incurred per cache miss by spreading out cache misses. The method may be used independently or in conjunction with methods for reducing the number of cache misses. As a result, the invention can further reduce memory hierarchy induced degradation in programs, that receive a performance boost from classical techniques, as well as benefiting programs, that are not afforded improved performance by the classical techniques.

The foregoing description refers to specific computer systems, processors and memory hierarchies and uses certain data structure sizes, cache line sizes and cycle times. However, the embodiment(s) of the invention described above is(are) intended to be exemplary only. The scope of the invention is therefore intended to be limited solely by the scope of the appended claims.

We claim:

1. A method for automatically structuring a program having at least one inner program loop to reduce an average cache miss penalty when the program is executed in a computer system having a CPU, a cache and a memory system, the method comprising the steps of:

locating the inner program loops that generate arrays which require repeated access to the cache; and spacing apart the arrays associated with the inner program loops in the memory system using inter-array padding so that cache misses do not occur close together when the inner program loops are executed in the computer system.

2. The method as claimed in claim 1, wherein said step of spacing apart the arrays further comprises the steps of:

organizing the arrays into one or more alignment groups;

assigning a different alignment constraint to each of the alignment groups; and determining for each array an amount of inter-array padding to conform to the alignment constraint for the alignment group to which the array is assigned.

3. The method as claimed in claim 2, wherein said assigning step further comprises the steps of:

determining a number of alignment groups;

computing a proportion of a cache line size using the number of alignment groups; and computing the alignment constraint for each groups, as a respective multiple of the proportion of the cache line size.

4. The method as claimed in claim 3, wherein said step of computing the alignment constraint further comprises conforming the alignment constraint to a further alignment constraint imposed by the memory system.

5. The method as claimed in claim 2, wherein said organizing step further comprises assigning an array to one of the alignment groups so that each array in any one alignment group is generated by an inner loop different from an inner loop that generates any other array in the alignment group.

6. The method as claimed in claim 1, wherein said spacing step further comprises spacing apart each array by shifting a starting point of each array by inserting inter-array padding, as necessary, relative to a starting point of a cache line access address in the memory system.

7. The method as claimed in claim 1, wherein said stop of spacing apart the arrays further comprises conforming the inter-array padding to an alignment constraint of the memory system.

8. A method for automatically structuring a program that includes at least one inner loop to reduce an average cache miss penalty when the program is executed in a computer system having a CPU, a cache and a memory system, the method comprising the steps of:
   a) identifying arrays generated by one or more of the inner loops, to permit the arrays to be spaced-apart when stored in the memory system;
   b) organizing the arrays in one or more alignment groups;
   c) determining the number of alignment groups;
   d) computing an alignment constraint for each alignment group; and
   e) mapping each array to conform to the alignment constraint computed for the alignment group to which the array belongs.

9. The method as claimed in claim 8, wherein said computing step further comprises:
   determining a cache line size used to read the cache;
   computing a proportion of the cache line size by dividing using the cache line size by the number of alignment groups; and
   computing the alignment constraint for each alignment group as a respective multiple of the proportion of the cache line size.

10. The method as claimed in claim 8, wherein said organizing step further comprises assigning an array to an alignment group so that each array in any one alignment group is generated by an inner loop different from an inner loop that generates any other array in the alignment group.

11. The method as claimed in claim 8, further comprising the step of:
   organizing the arrays in one or more loop groups so that each array in a loop group is identified in at least one inner loop with another array in the loop group and not identified with any arrays in any other loop group; and
   wherein (b) to (e) are performed for each loop group.

12. The method as claimed in claim 8, wherein said mapping step further comprises shifting a starting point of each array by inserting inter-array padding, as necessary, relative to a cache line access address in the memory system.

13. The method as claimed in claim 8, wherein said computing step further comprises conforming the alignment constraint to a further alignment constraint imposed by the memory system.

14. A computer readable medium containing executable program instructions for structuring a program having at least one inner loop that generates arrays to reduce the average cache miss penalty when the program is executed in a computer baying a CPU, a cache and a memory system, the computer readable medium comprising:
   program instructions for identifying arrays generated by the inner loops;
   program instructions for determining an alignment constraint for each array; and
   program instructions for inserting padding between arrays when the arrays are stored in the memory system, the amount of padding inserted being determined by the alignment constraint.

15. The computer readable medium as claimed in claim 14, wherein the program instructions for determining the alignment constraint comprises:
   program instructions for organizing the arrays into one or more alignment groups; and
   program instructions for assigning a different alignment constraint amount to each of the alignment groups.

16. The computer readable medium as claimed in claim 15, wherein the program instructions for organizing comprises:
   program instructions for determining a cache line size of the cache;
   program instructions for determining a number of alignment groups;
   program instructions for computing a proportion of the cache line size by dividing the cache line size by the number of alignment groups; and
   program instruction for computing the alignment constraint amount for each alignment group as a respective multiple of the proportion of the cache line size.

17. The computer readable medium as claimed in claim 16, wherein the program instructions for organizing comprises program instructions for assigning an array to one of the alignment groups so that each array in any one alignment group is generated by an inner loop that is different from all other inner loops that generate arrays in the alignment group.

18. The computer readable medium as claimed in claim 17, wherein the program instructions for computing the alignment constraint comprise program instructions for computing the alignment constraint to a further alignment constraint imposed by the memory system.

19. The computer readable medium as claimed in claim 14, wherein the program instructions for inserting padding comprises program instructions for shifting a starting point of each array relative to a cache line access address in the memory system.

20. The computer readable medium as claimed in claim 14, wherein the program instructions for computing an alignment constraint includes program instructions for conforming the alignment constraint to a further alignment constraint imposed by the memory system.

21. A computer readable medium including executable program instructions for structuring a program having at least one inner loop that generates arrays to reduce an average cache miss penalty when the program is executed in a computer having a CPU, a cache and a memory system, the computer readable medium comprising:
   a) program instructions for identifying one or more of the inner loops that generate arrays which require padding when stored in the memory system;
   b) program instructions for arranging the arrays into one or more alignment groups;
   c) program instructions for determining a number of alignment groups;
   d) program instructions for computing an alignment constraint for each alignment group; and
   e) program instructions for inserting padding between at least two arrays stored in the memory system, the amount of padding inserted being determined by the alignment constraint for the alignment group to which the respective arrays belong.

22. The computer readable medium as claimed in claim 21, wherein the program instructions for computing an alignment constraint comprises:
   program instructions for determining a cache line size of the cache;
   program instructions for computing a proportion of the cache line size by dividing the cache line size by the number of alignment groups; and program instructions for computing the alignment constraint for each alignment group as a respective multiple of the proportion of the cache line size.

23. The computer readable medium as claimed in claim 21, wherein the program instructions for arranging comprises program instructions for assigning an array to one of the alignment groups so that each array in any one alignment group is generated by an inner loop different from any other array in the one alignment group.

24. The computer readable medium according to claim 21, further comprising program instructions for grouping the arrays into one or more loop groups where each array in any one loop group is identified in at least one inner loop with another array in the one loop group and not identified with any arrays in any other loop group; and wherein the program instructions (b) to (e) operate for cache loop group.

25. The computer readable medium according to claim 21, wherein the program instructions for inserting padding comprises program instructions for shifting the starting point of each array relative to a starting point of a cache line access address in the memory system.

26. The computer readable medium according to claim 21, wherein the program instructions for determining an alignment constraint includes program instructions for conforming the alignment constraint to a further alignment constraint of the memory system.

27. A computer system comprising:

a CPU operable to execute a program having one or more inner loops;

a cache having a plurality of cache lines, each having a cache line size and coupled to the CPU;

a memory system coupled to the cache to provide data to or to receive data from the cache in response to access request; and a plurality of data arrays stored in the memory system, said arrays to be accessed in at least one of the inner loops and cache may having a starting point spaced out by a respective alignment constraint from a starting point of a cache line access address in the memory system; and wherein the alignment constraint is determined from a portion of the cache line size so as to reduce the average cache miss penalty when the at least one inner loop is executed.

* * * * *

UNITED STATES PATENT AND TRADEMARK OFFICE
CERTIFICATE OF CORRECTION

PATENT NO. : 6,907,509 B2
DATED : June 14, 2005
INVENTOR(S) : Brian C. Hall et al.

It is certified that error appears in the above-identified patent and that said Letters Patent is hereby corrected as shown below:

Column 13,
Line 54, between "computer" and "a CPU" replace "baying" with -- having --.

Column 14,
Line 27, replace "computing" with -- conforming --.

Signed and Sealed this

Thirty-first Day of January, 2006

JON W. DUDAS
*Director of the United States Patent and Trademark Office*